Aug. 30, 1966  D. SIGMOND  3,269,288
SURVEILLANCE CAMERA

Filed June 12, 1964  3 Sheets-Sheet 1

Aug. 30, 1966  D. SIGMOND  3,269,288
SURVEILLANCE CAMERA
Filed June 12, 1964
3 Sheets-Sheet 2
*Fig.3*
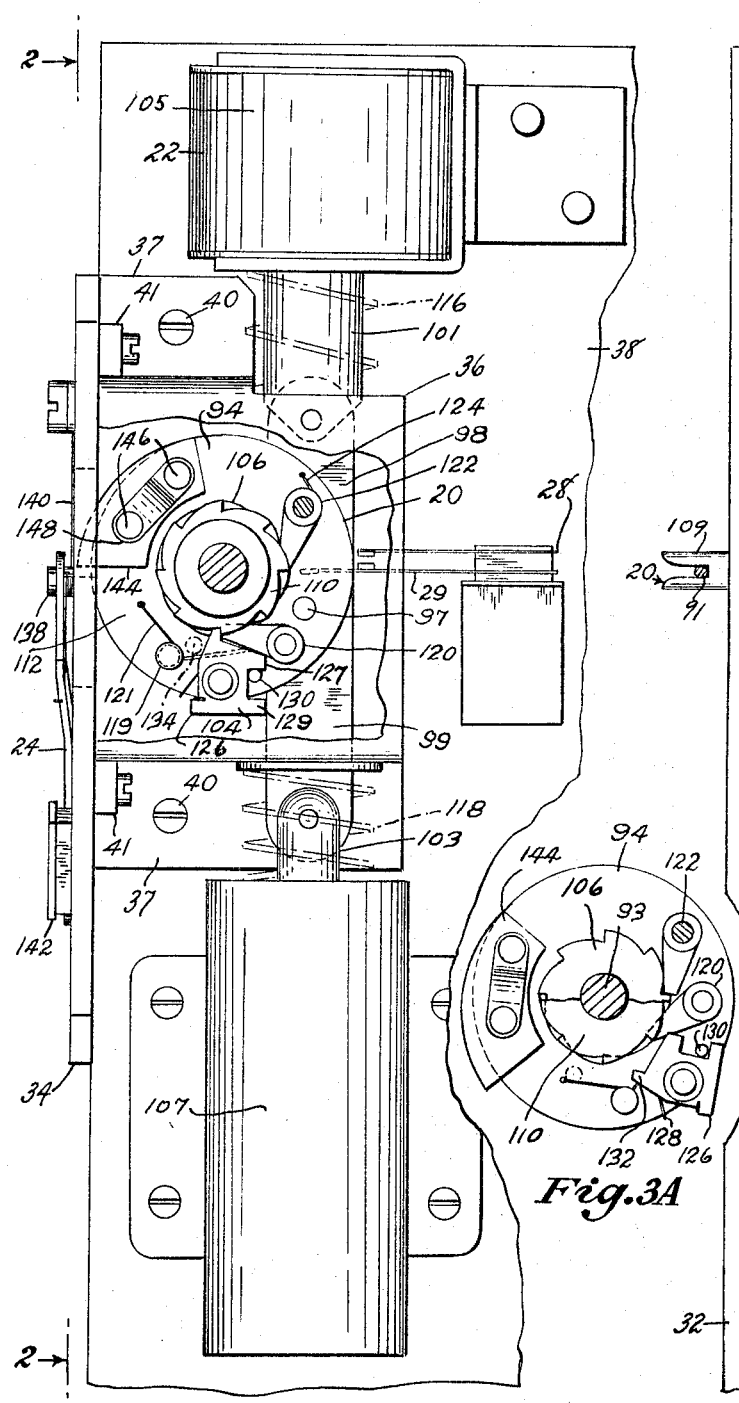
*Fig.3A*
*Fig.2*
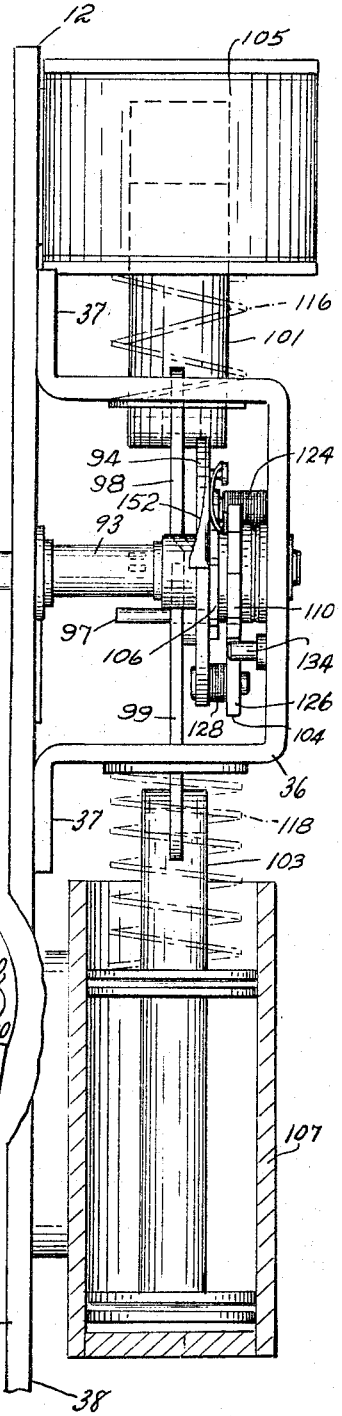

Aug. 30, 1966

D. SIGMOND 3,269,288

SURVEILLANCE CAMERA

Filed June 12, 1964

United States Patent Office 3,269,288
Patented August 30, 1966

3,269,288
SURVEILLANCE CAMERA
David Sigmond, 1311 Brightwater Ave., Brooklyn, N.Y.
Filed June 12, 1964, Ser. No. 374,601
4 Claims. (Cl. 95—11)

This invention relates to still picture photography and more particularly to cameras capable of taking a large number of still pictures without reloading.

In connection with photography for security and other surveillance purposes, it is necessary that the camera be of simple and foolproof construction so that it may have a long trouble-free life even when used by relatively inexperienced operators.

It is therefore among the objects of the present invention to provide a relatively compact camera in which the film is carried within an enclosed cassette.

Another object of the invention lies in the provision of a camera structure whereby that portion of the strip film which is to be exposed is maintained precisely at the focal plane of the camera even though the camera film is carried within an interchangeable cassette.

A further object of the invention is to have a precise film transport means so that each photograph shall take up an exact film frame with no overlapping or double exposure and no wasted film between frames.

A still further object herein lies in the provision of moving means which may be smoothly, quickly and quietly operated.

Another object of the present invention is to provide a smooth-acting shutter-actuating mechanism which is correlated with the film advancing means.

These objects and other incidental ends and advantages will more fully appear in the progress of this disclosure and be pointed out in the appended claims.

In the drawings, in which similar reference characters designate corresponding parts throughout the several views:

FIGURE 2 is a front elevational view, comparable to the right hand portion of FIGURE 1 with the shutter base plate and cassette removed.

FIGURE 3 is a fragmentary elevational view taken on line 3—3 of FIGURE 1, looking in the direction of the arrows.

FIGURE 3A is a front elevational view of disc 94 of FIGURE 3 and associated parts in a rotated position thereof.

Figure 1:
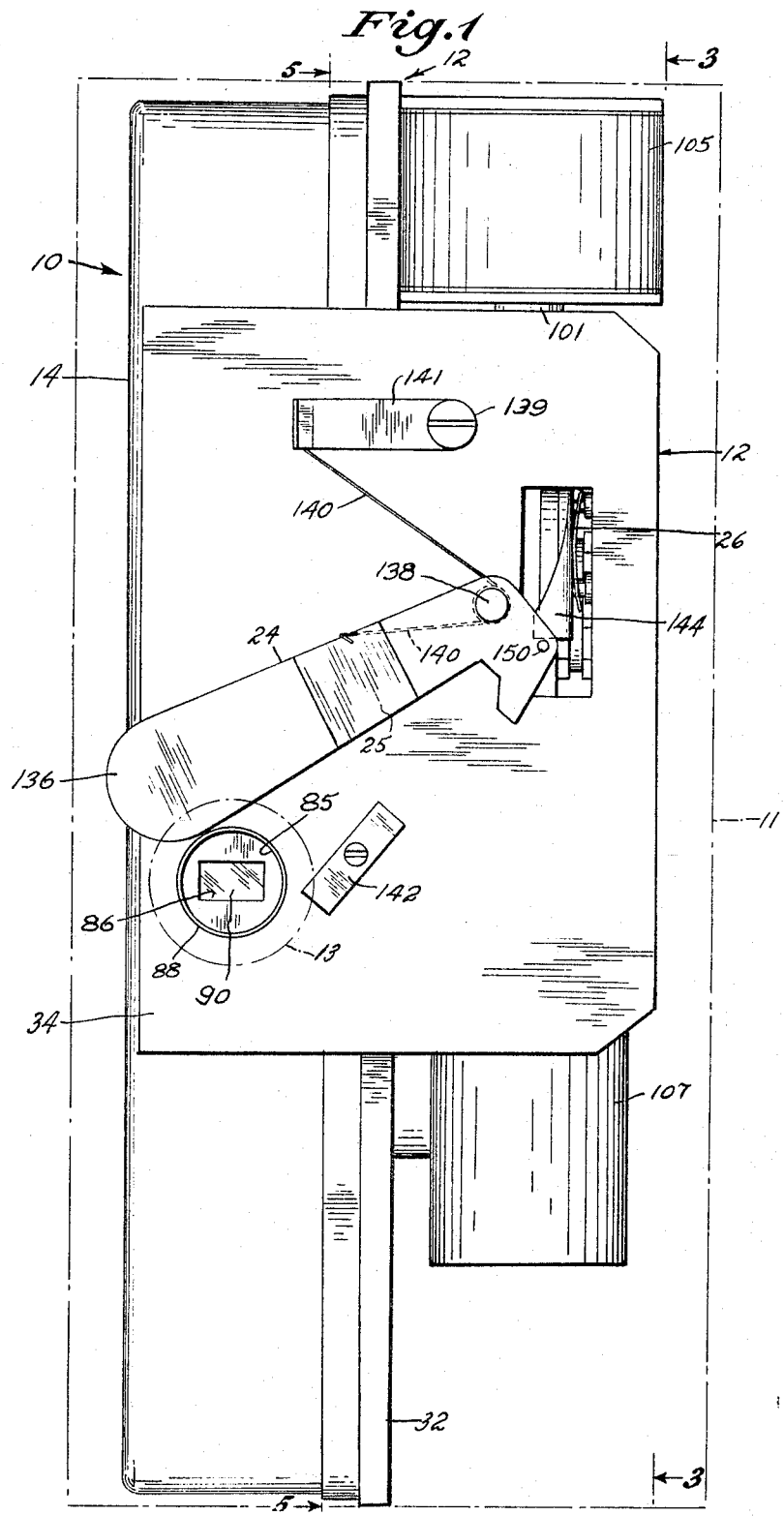
FIGURE 1 is a front elevational view of a preferred embodiment of the invention, with the shutter blade in the open position.

In accordance with the invention, the camera, generally indicated by reference character 10, comprises broadly: a frame 12 of somewhat T-shaped cross section, a cassette 14, film guide means 16, film transport means 18, film stepped advancing means 20, moving means for said advancing means 22, shutter means 24, shutter actuating means 26, and switch means 28.

The entire assembly shown on FIGURE 1 is adapted to be suitably disposed in a camera casing 11, indicated in dot-dash lines on FIGURE 1. The casing 11 carries a lens 13, indicated by the dashed lines in FIGURE 1. Since the casing and the lens will vary with the specific uses to which the camera is put and their environmental conditions, the same is not shown in detail, as adaptations thereof may well be made by those skilled in the art to which the present invention relates.

The lens 13 may of course have known focusing means on the barrel thereof so that the photographic image may be cast sharply on the focal plane 30.

The frame 12 includes a main base plate 32 and a front shutter base plate 34, as well as a bearing plate 36. The bearing plate rigidly secures the base plate 32 and shutter base plate together in their normal disposition, and is of a generally U-shaped cross section. The legs 37 of the plate 36 are secured to the right-hand surface 38 of plate 32 in a suitable manner, as by the screws 40. The base plate 34 is connected to the bearing plate 36 by brackets 41 integral with the bearing plate 36. The T frame thus formed by the plates 32, 34 and 36 has a high degree of rigidity, which is important for sharp image pictures since the T frame acts as a positive bearing for the cassette element 14. The bearing plate 36 also provides a rigid support for the film stepped advancing means and the shutter means so that long trouble-free and precise operation may obtain.

Figure 7:
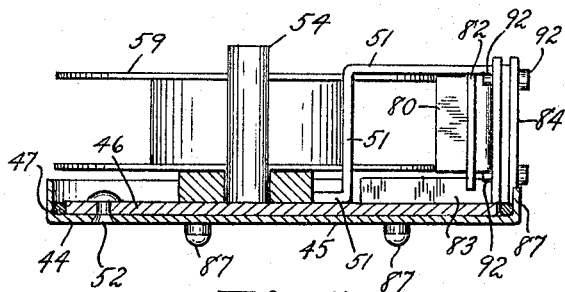
FIGURE 7 is a fragmentary sectional view of FIGURE 5 as seen from the plane 7—7 thereon.
Figure 6:
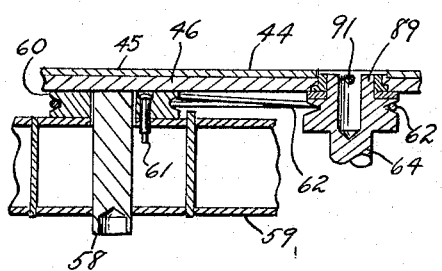
FIGURE 6 is a fragmentary sectional view as seen from the plane 6—6 on FIGURE 5.

The cassette 14 includes a cassette body 44 which may be of laminar construction best seen in FIGURE 7, including the outer case 45 and the inner plate 46.

The inner plate 46 is of lesser size, providing an annular space which contains a resilient light-sealing gasket 47 which coacts with the peripheral edge of the cassette cover member 49. The cover member 49 may be frictionally retained in place as well as by a screw (not shown) which engages the internally threaded post 50. The post 50 projects forwardly as viewed in FIGURE 5 from an irregularly-shaped bearing 51. The case 45 and plate 46 are connected by the rivets 52.

Figure 5:
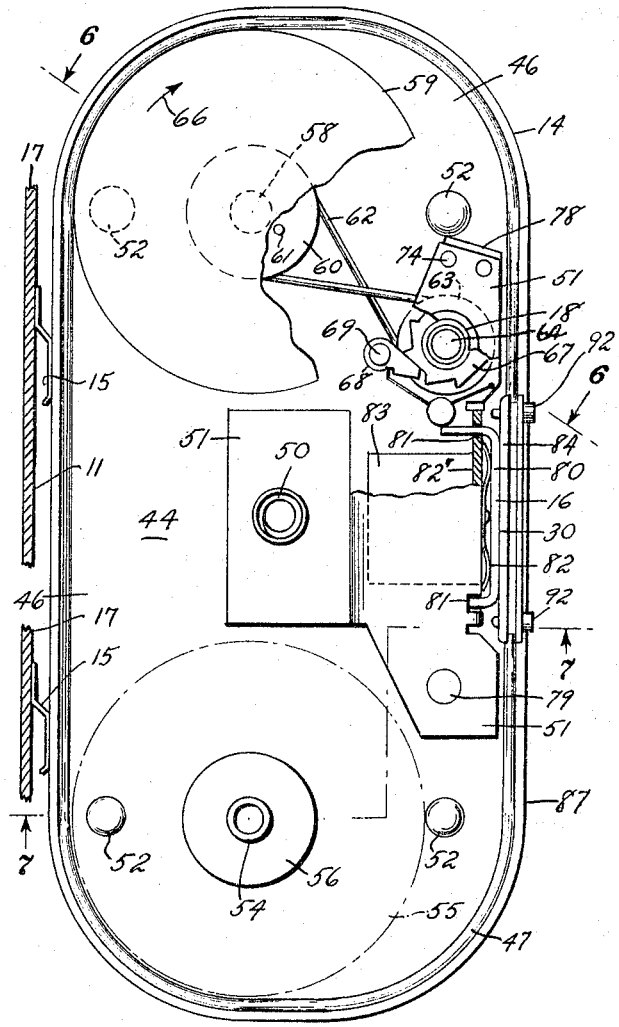
FIGURE 5 is a fragmentary side elevational view of FIGURE 4 as seen from the left thereof.
Figure 4:
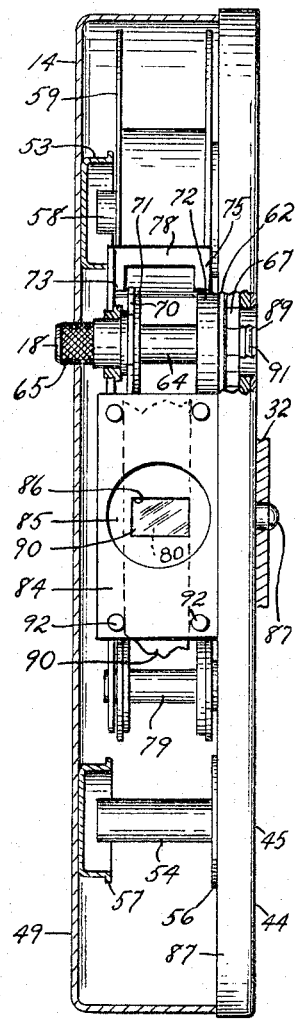
FIGURE 4 is a fragmentary front elevational view of the cassette made in accordance with the present invention, and corresponds to the left portion of FIGURE 1 but on a reduced scale, with the shutter base plate absent.

As viewed in FIGURE 5, projecting forward from the plate 46 is a spindle 54 for a film supply reel 55. Secured to the plate 46 is a braking disc 56, so that when the cover member 49 is in place the cup 57 carried by the cover 49 has a compressive effect so as to avoid slack as the film leaves the reel. The spindle 58 for the take-up reel 59 is fixedly mounted on the plate 46 and has journalled thereon a driven pulley 60 with a pin 61 for engaging the reel 59. Pulley 60 is driven by belt 62 which is in turn driven by the pulley 63 mounted on shaft 64. The left end of shaft 64 as viewed in FIGURE 4 is kurled to form a finger piece 65 for manual movement of the take-up reel 59. Unidirectional movement of the pulley 60 and reel 59 in the direction of the arrow 66 is assured by the ratchet 67 and spring pressed pawl 68 mounted pivotally at 69 on the plate 46.

Shaft 64 carries a film perforation-engaging sprocket wheel 70 as well as two flanges 71 and 72 which support the film as it passes beneath the guides 73 and 75 which extend from the U-shaped member 78 secured to the upper end of the bearing 51 by rivets 74.

The bearing 51 at the lower end thereof journals the idler film pulley 79.

A U-shaped pressure plate 80 forms part of the film guide means 16, said plate 80 being yieldably mounted by having the legs thereof engaged in a pair of slots 81, and is urged to the right as viewed in FIGURE 5 against a fixed plate 84 by the leaf spring 82. The slots 81 are disposed in the forward flange 82′ of the bearing 51.

The film guide means 16 includes the stationary plate 84 having a recess 85 with a film exposing aperture 86. The plate 84 is rigidly secured to the flange 87 of the case 45 so that the film 90, which is pressed thereagainst by the plate 80, is maintained precisely in the focal plane of the camera and normal to the optical axis of the lens 13.

In order to assure the precise and exact location and alignment of the focal plane of the cassette element 14 within the camera, the plate 84 is provided with a plurality of forwardly projecting spacing members 92. The members 92 are in the form of pins, the forward surface of which is ground to precise and equal dimensional length. When the parts are in proper engagement, the pins 92 abut against the inner surface of the shutter plate 34. The pins 92 also extend rearwardly of plate 84 and act as precisely positioned side edge guides for the film 90. The cassette is kept tight and in proper position by being pressed toward the plate 34 by springs 15 disposed between wall 17 of casing 11. The springs 15 force the pins 92 into contact with the shutter plate 34.

The plate 84 is further maintained in a rigid and precise position by the integral bracket 83 which is secured to the innerplate 46 (FIGURE 7).

Projecting to the right as viewed in FIGURE 4 are a plurality of locating pins 87 which are adapted to engage correspondingly positioned elongated slots or orifices in the main base plate 32 (FIGURE 4). The locating pins serve to guide the cassette into its proper position in the camera when it is being loaded.

The right-hand end of the shaft 64 is provided with a socket 89 with a transverse pin 91 adapted to be engaged by the bifurcated end 109 of the main shaft 93 of the film stepped advancing means. Thus when the take-up reel 59 is held in engagement with the pin 61 by the cup 53, and the cassette cover member 49 is in place, the film 90 is adapted to be unwound from the reel 55 and wound upon the reel 59 by the film transport means 18 which in turn are driven by the film stepped advancing means 20.

One of the problems in high load camera construction is that the strip film 90 has substantial resiliency, and the lower its temperature the more spring-like it is. This quality of the film causes it to tend to retract if not restrained, after it has been advanced. This undesirable shifting, if uncorrected, produces inaccurate positioning of the film frames, and cumulatively can cause a very substantial loss of film space. Thus a length of film 90 adapted to have 2,000 frames can have a cumulative loss resulting in only 1,800 useable frames.

Retraction or reverse travel of the film may have an even more deleterious effect because, where the camera is used to take a picture of either a person or a document which will not be available for rephotographing at a later time, a double exposure may forever prevent obtaining a photograph of a critical unique document or person. By virtue of the present invention, reverse movement of the film is absolutely prevented.

I have assured full usefulness of the film with no loss by positive predetermined film advance, coupled with positive and precise retention of the film in each consecutive advanced position.

This action is accomplished by a primary film advancing ratchet 102, and a secondary film stopping mechanism 104.

The film stepped advancing means 20 best shown in FIGURES 2, 3 and 3A includes a main shaft 93 which is journalled between the main base plate 32 and the U-shaped bracket or bearing plate 36. Shaft 93 carries rotatably mounted thereon a disc 94. Fixedly secured to shaft 93 immediately forward of disc 94 is a film advancing or first ratchet wheel 106, and forwardly thereof is a film stopping or second ratchet wheel 110. The buttressed teeth of wheels 106 and 110 are oppositely directed so that the radial tooth surfaces of wheel 106 face counterclockwise, while the radial tooth surfaces of wheel 110 face clockwise as viewed in FIGURES 3 and 3A.

The disc 94 is connected by a pin 97 to driving links 98 and 99, which are connected to the solenoid armature 101, and the dashpot piston 103, respectively. When the solenoid 105 is energized, upward movement of armature 101 rotates disc 94 counterclockise as seen in FIGURE 3 to the position shown in FIGURE 3A, through exactly 45 degrees, thereby compressing dashpot spring 116 and bottom spring 118.

Pawl 120 is urged by spring 121, which encircles a stud 119 on the disc 94, against the ratchet wheel 106, so that on the upstroke of link 98, the pawl 120 rides over wheel 106, and on the downstroke it engages and gives the shaft 93 a clockwise 45 degree turn. Rotation of the shaft 93 in a clockwise direction (FIGURE 3) is prevented by a relatively stationary pawl 122 which is pivotally mounted on the inner surface, or to the left as viewed in FIGURE 2, of the bearing 36. The free end of pawl 122 is urged against the ratchet wheel 106 by a spring 124. The pawl 122 thus prevents the film 90 itself from shifting its position in a direction which would move it toward the supply reel.

Pivotally mounted on the disc 94 is the mechanism for preventing overtravel of the film 90 in a feeding direction that is to say excess movement of shaft 93 in a clockwise direction, and this has been referred to as the secondary film stopping mechanism 104. This mechanism includes an irregularly shaped lever 126, the configuration and movements of which are best seen in FIGURES 3 and 3A, and which is pivotally mounted on the disc 94 and normally urged in a counterclockwise direction about its pivot by a spring 128. Lever 126 has a pair of spaced fingers 127 and 129 which co-act with the detent 130 fixed on disc 94, and a lug 132 which co-acts with the film stopping or second ratchet wheel 110, and also reacts to a second detent 134 which is secured to the bearing 36. Thus when the disc 94 is pulled around to the position shown in FIGURE 3A, the spring 128 pulls the lever 126 to its inactive condition. As the disc 94 is moved in a colckwise direction to advance a new frame of film 90, just as the pawl 120 reaches the end of its travel, the lug 132 meets the detent 134 and the lever 126 gets swung around so that the lug 132 is forced by detent 134 up against a tooth face of the ratchet wheel 110, to an exact position, so that the ratchet wheel 110 can make only the predetermined amount of movement, and thereby the film will have been advanced exactly one frame.

The moving means 22 of the camera includes the solenoid 105 which is mounted on the surface 38 of plate 32, and the dashpot 107, similarly mounted. The solenoid 105 electromechanically operates the shutter blade 136, as well as transports the film. The dashpot makes the motion of the links 98 and 99 more uniform and quiet, so as to compensate for the change in speed as inertia of the moving parts is overcome, in each direction. The switch means 28 has an arm 29 positioned so as to be actuated by the pin 97 when the solenoid is energized, and means 28 may be used to close a suitable associated circuit, such as a counting device (not shown).

The shutter means 24 includes the shutter blade 136 which is adapted to swing about the pivot 138 mounted on the front shutter base plate 34 (FIGURE 1). This single leaf shutter construction is quieter than a multiple leaf type, and the bend 25 makes a light-proof sliding seal against plate 34. The plate 34 is provided with a raised portion 88 around the recess 85 to reduce frictional contact between the blade and plate while permitting a light proof seat of the blade on the raised portion. Blade 136 is normally urged to swing to its closed position in a counterclockwise direction by a spring 140 so that speed is adjusted by changing the position of arm 141 about set screw 139 on plate 34. The shutter blade 136 in its closed position rests against the stop 142. The shutter is opened by the tripper 144 which is slidably mounted by means of a pair of pins 146 on the disc 94. These headed pins permit movement of the tripper 144 axially thereof so that it may laterally reciprocate as viewed in FIGURE 1. The tripper 144 is urged to the left as viewed in said figure, normally by the action of a leaf spring 148 which is suitably orificed to be interposed between said tripper and the heads on the pins 146. When the solenoid 105 is energized, it pulls the disc 94 so as to cause the tripper 144 to engage against the pin 150 and this swings the blade 136 open. After the tripper passes the pin 150, the spring 140 closes the shutter by moving the blade 136 over the opening 86. When the disc leaves its lowermost position, as shown in FIGURE 3A, the tripper 144 rises, the cam surface rides up over the contacting portion of the pin 150, so that said cam surface 152 causes the tripper to be pressed against the spring 148. After the lower edge of the tripper has passed the pin 150, the tripper quickly snaps back ready for the next camera exposure. The in line motion of the solenoid makes it quiet and the dashpot prevents jerky film movement to avoid inertial forming of the loop, or damaging the sprocket holes, or stretching the film.

What is claimed is:

1. A photographic surveillance camera comprising: a casing, said casing having an aperture therein, a camera lens carried by the casing in register with the aperture, a rigid frame member of substantially "T" shaped cross section secured to the casing comprising a base plate and an apertured front shutter base plate, a cassette for holding a supply of photographic strip film carried within said casing upon the frame member, said cassette having an opening therein, a fixed plate secured within the cassette opening, said fixed plate having a film exposing aperture therein in register with the casing and frame apertures, film guide means in said cassette, spaced bearing members carried by the fixed plate, extending outwardly thereof and disposed against the front shutter base plate whereby the film within the cassette is held in positive spaced relationship with respect to said front plate and in the desired focal plane, film stepped advancing means comprising a solenoid carried by the frame member, means to control the action of the solenoid, and a shutter swingably carried upon the front shutter base plate, overlying the aperture in said front plate and responsive to the action of the solenoid to expose the film within the cassette.

2. A camera according to claim 1 in which the solenoid control means consists of a dashpot.

3. A camera according to claim 1 in which the shutter is of single leaf construction.

4. A camera according to claim 1 in which the bearing members are in the form of spaced pins disposed about the aperture in the fixed plate and extending both forwardly and rearwardly of said fixed plate whereby the film is guided between the rearwardly extending portions of the pins.

References Cited by the Examiner
UNITED STATES PATENTS

| | | | |
|---|---|---|---|
| 2,553,656 | 5/1951 | Kirby | 95—11 |
| 2,652,209 | 9/1953 | Hodges | 242—71 |
| 2,732,754 | 1/1956 | Foster | 242—55.13 |
| 2,911,894 | 11/1959 | Hennig | 95—31 X |
| 3,125,940 | 3/1964 | Taubes | 95—31 X |

JOHN M. HORAN, *Primary Examiner.*